US009164657B2

(12) United States Patent
Mulloy et al.

(10) Patent No.: US 9,164,657 B2
(45) Date of Patent: *Oct. 20, 2015

(54) FILE MANAGEMENT AND TRANSFER USING USER INTERFACE ICONS ASSOCIATED WITH APPLICATIONS

(71) Applicant: Verizon Patent and Licensing Inc., Basking Ridge, NJ (US)

(72) Inventors: Brandon L. Mulloy, Brooklyn, NY (US); Summer Westbrook, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/107,610

(22) Filed: Dec. 16, 2013

(65) Prior Publication Data
US 2014/0101566 A1   Apr. 10, 2014

Related U.S. Application Data

(63) Continuation of application No. 12/838,749, filed on Jul. 19, 2010, now Pat. No. 8,621,386.

(51) Int. Cl.
| G06F 3/0481 | (2013.01) |
| G06F 9/44 | (2006.01) |
| G06F 9/445 | (2006.01) |
| G06F 3/0486 | (2013.01) |

(52) U.S. Cl.
CPC .......... *G06F 3/04817* (2013.01); *G06F 3/0486* (2013.01); *G06F 9/445* (2013.01); *G06F 9/4443* (2013.01)

(58) Field of Classification Search
CPC .................................................. G06F 3/04817
See application file for complete search history.

(56) References Cited

U.S. PATENT DOCUMENTS

| 7,117,243 B2 | 10/2006 | Peart |
| 7,409,405 B1 | 8/2008 | Masinter et al. |

(Continued)

OTHER PUBLICATIONS

"Google Wave—Wikipedia," http://en.wikipedia.org/wiki/File:Google_Wave.png, 11 pages, Modified Jul. 6, 2010.

*Primary Examiner* — Scott Baderman
*Assistant Examiner* — Asher Kells

(57) ABSTRACT

A method performed by a user device includes receiving a request to open a first application associated with a selected file; retrieving, in response to the request, information regarding a user interface (UI) associated with the first application via which multiple operations on the selected file are automatically performed, and a set of second applications automatically associated with the first application based on a frequency of use of each of the second applications in performing respective ones of the multiple operations with respect to other files via the user device, the information regarding the UI including: information associated with a UI icon corresponding to the first application, and information identifying a set of icons, that each correspond to a respective different one of the set of second applications; presenting, via a display, the UI icon and the identified set of icons, based on the information regarding the UI; receiving, via the UI icon, an instruction to move the selected file to one of the identified set of icons; and performing a selected operation on the selected file using an identified application, of the set of second applications, that corresponds to the one of the identified set of icons.

23 Claims, 8 Drawing Sheets

(56) References Cited

U.S. PATENT DOCUMENTS

| | | |
|---|---|---|
| 7,895,346 B2 | 2/2011 | Faisal |
| 8,484,100 B2 | 7/2013 | Feldman et al. |
| 2002/0057292 A1 | 5/2002 | Holtz |
| 2002/0059288 A1 | 5/2002 | Yagi et al. |
| 2003/0084096 A1 | 5/2003 | Starbuck et al. |
| 2004/0155901 A1 | 8/2004 | McKee et al. |
| 2005/0268250 A1 | 12/2005 | Skistimas et al. |
| 2006/0059174 A1 | 3/2006 | Mese et al. |
| 2007/0124677 A1 | 5/2007 | de los Reyes et al. |
| 2007/0240098 A1 | 10/2007 | Averett et al. |
| 2011/0028138 A1 | 2/2011 | Davies-Moore et al. |
| 2011/0167339 A1 | 7/2011 | Lemay |
| 2011/0307354 A1 | 12/2011 | Erman et al. |
| 2013/0125056 A1 | 5/2013 | Suda |

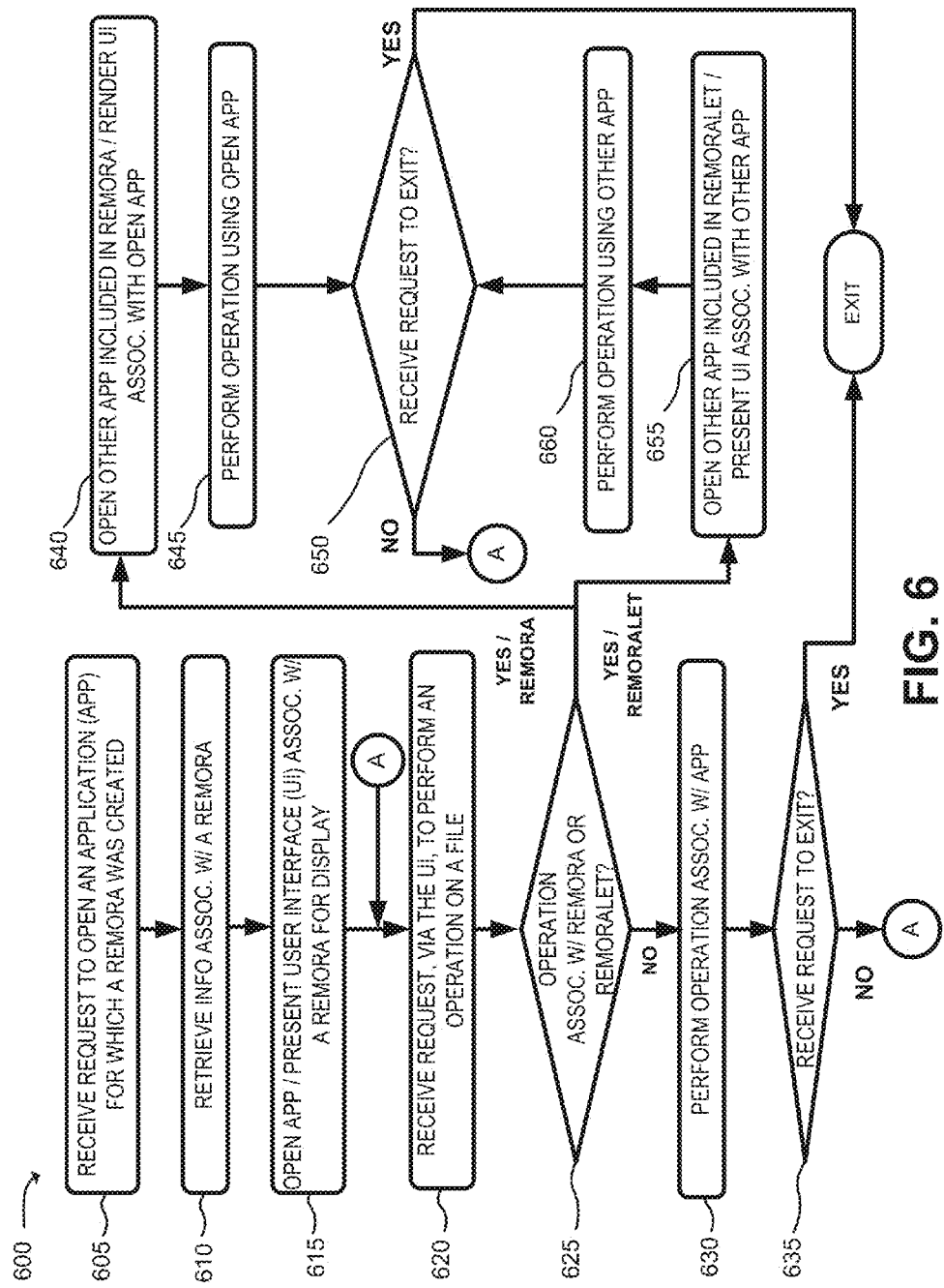

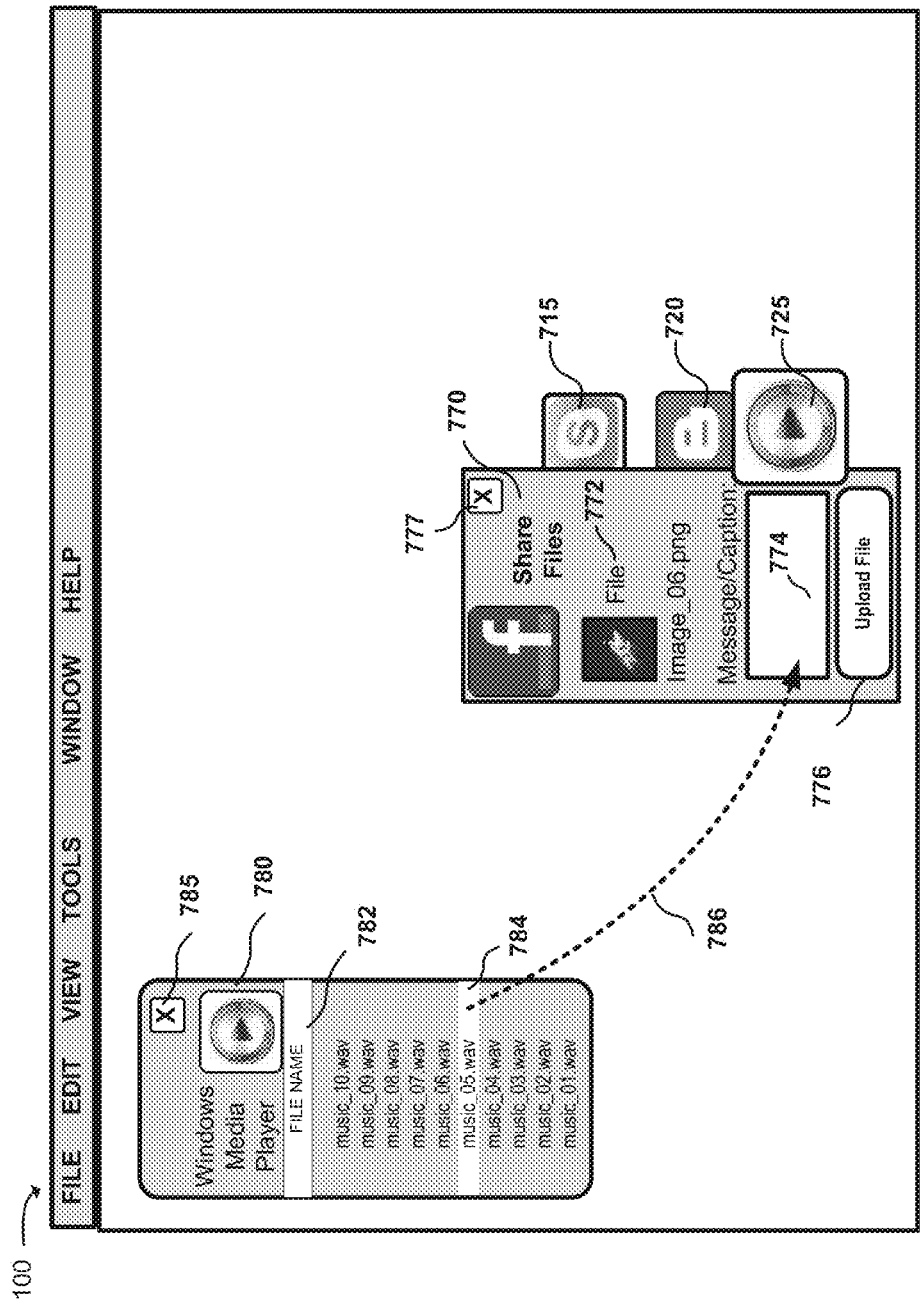

FILE MANAGEMENT AND TRANSFER USING USER INTERFACE ICONS ASSOCIATED WITH APPLICATIONS

CROSS-REFERENCE TO RELATED APPLICATION

This application is a continuation of U.S. patent application Ser. No. 12/838,749, filed on Jul. 19, 2010, the disclosure of which is hereby incorporated herein by reference in its entirety.

BACKGROUND

Today's user devices are capable of using an ever-increasing variety of applications that continue to improve the user's experience. The ever-increasing variety of applications enable a user device to manage an array of file types, such as documents, images, video, music, text messages, data, etc., and/or to perform operations on the files, such as transferring, uploading/downloading, emailing, instant messaging, saving, opening, etc. Users usually perform a task by opening an application on a desktop of a user device (e.g., by opening a user interface associated with the application) and using the application to perform an operation on a file. However, users are performing increasingly complex tasks by opening a variety of applications on a desktop of a user device (e.g., by opening a variety of user interfaces associated with the variety of applications) that permit the user to perform multiple operations on a file. Unfortunately, performing the increasingly complex tasks, using the variety of applications, are making it more and more difficult for users to keep track of the multiple user interfaces corresponding to the variety of applications, which detracts from the user's experience.

BRIEF DESCRIPTION OF THE DRAWINGS

FIG. 6 is a flowchart of an example process for using a remora to perform an operation on a file; and FIGS. 7A and 7B are diagrams of example remora and/or remoralet user interfaces.

DETAILED DESCRIPTION OF PREFERRED EMBODIMENTS

Figure 1:
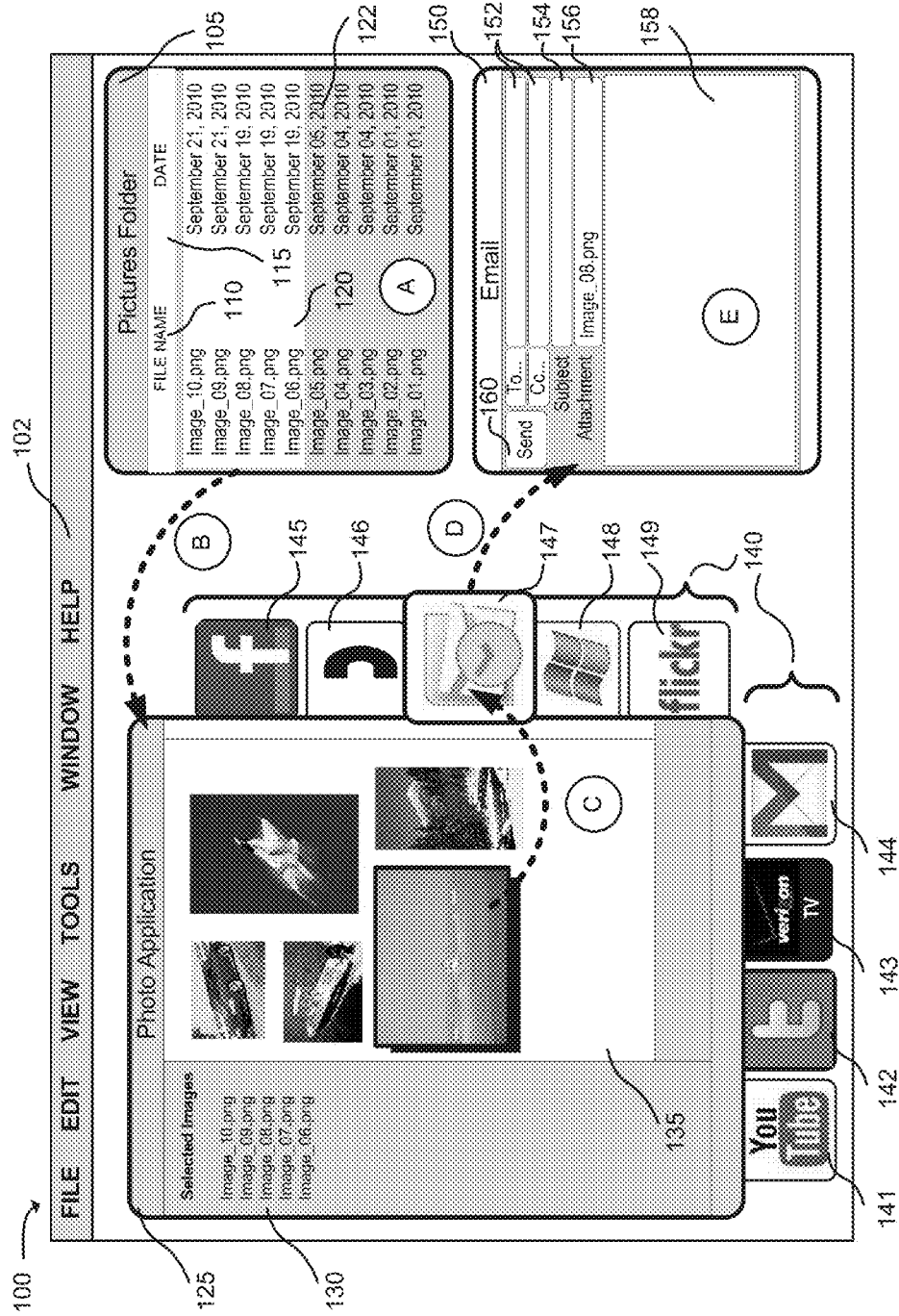
FIG. 1 is a diagram that illustrates an overview of a file management and transfer system that uses a remora implementation described herein.

The following detailed description refers to the accompanying drawings. The same reference numbers in different drawings may identify the same or similar elements. Also, the following detailed description does not limit the invention.

An implementation described herein may include systems and/or methods that provide for file management and transfer using a remora. More particularly, the file management and transfer using a remora implementation may use a remora-generating application (hereinafter referred to as a "generating application") to perform an operation to set up a remora for an application and/or to perform other operations associated with file management and transfer using the remora.

The term "remora" and/or "remora UI" as used herein, may be used interchangeably and may include a user interface (e.g., a remora user interface) associated with an application that includes icons (e.g., remora icons) corresponding to other applications that have been associated with the application (e.g., via a remora set up operation) and/or are attached within and/or to the periphery of the remora user interface (UI). The term "remoralet," may be created for a particular application that corresponds to a remora icon and which may include other icons (e.g., remoralet icons) corresponding to further applications that have been associated with the particular application (e.g., via a remora set up operation) and/or are attached within and/or to the periphery of the remora icon. The term "icon," as used herein, may include a symbol, object, pictogram, figure, etc. that is displayed via a UI and/or that causes an application to open and/or some act to be performed when selected (e.g., using a pointing device, a keyboard/keypad, a touch screen, etc.). For example, an icon, corresponding to an application and rendered on a display of a user device, may be selected by a user of the user device, which may cause the application to be opened.

In one example implementation, a remora UI may permit a user to perform an operation that includes multiple applications by opening the application that includes a remora (e.g., by opening the UI associated with the application that includes icons associated with other applications) and performing an operation on a file (e.g., transferring, uploading/downloading, saving, emailing, attaching, deleting, etc.) using another application or collection of other applications corresponding to a remora icon or collection of remora icons, respectively, that are displayed within, adjacent to, and/or in contact with the border of the UI associated with the application.

In another example implementation, a remora UI may permit a user to perform another operation that includes further applications by opening a particular application that includes a remoralet (e.g., by opening another UI associated with the particular application that corresponds to a remora icon and which includes remoralet icons). The user may, for example, perform another operation on a file using a further application, or collection of further applications, that correspond to the remoralet icon, or collection of remoralet icons, respectively, that are displayed within, adjacent to, and/or attached to the border of the remora icon associated with the particular application.

In yet another example implementation, a user may set up a remora UI for an application by associating other applications with the application. For example, the user may use a remora set up UI (e.g., presented for display on a user device by the generating application) to select other applications to be included in a remora associated with an application. The generating application may receive information associated with the other applications and may associate the other applications with the application to create a remora for the application.

In still another example implementation, a user may set up a remoralet for a particular application, included in a remora, that corresponds to a remora icon. For example, the user may use the remora set up UI to select further applications to be included in a remoralet associated with the particular application. The generating application may receive information associated with the further applications and may associate the further applications with the particular application to create a remoralet for the particular application.

In a further example implementation, a user may use a remora to perform a task. For example, a user may open an application for which a remora was created and may select a file on which to perform a particular operation. The user may, for example, perform the operation by moving and/or transferring the selected file from a UI associated with the application to a remora icon, associated with the remora (e.g., sometimes referred to as a destination icon), that corresponds to another application (e.g., an email application, a social networking application, an instant messaging application, etc.) that is capable of performing some other operation (e.g., attaching a file to an email or some other operation, uploading a file, etc.). Moving the file to the icon may automatically open the other application (e.g., an email message UI) that may permit the user to perform another operation to complete the task (e.g., by entering recipients, a subject line, and/or any text into the email UI and/or by sending the email with the selected file attached).

In another example, the user may use a remoralet to perform a task. Using the example above, the other application (e.g., the email application) may include a remoralet that permits the user to select a particular icon, associated with the remoralet (e.g., a remoralet icon), which may cause a particular application to open. In this example, the user may select another file, such as a photo, and may move and/or transfer the other selected file to the UI associated with the other application (e.g., the email application), which may perform the other operation (e.g., attaching the photo to the email, etc.).

FIG. 1 is a diagram that illustrates an overview of a file management and transfer system that uses a remora implementation described herein. As illustrated in FIG. 1, desktop UI 100 may be rendered on a display, associated with a user device, via which information may be received from a user (e.g., a user of a user device) and/or presented to a user. In one example, desktop UI 100 may be a desktop rendered on a user device (e.g., by an operating system associated with the user device) that may permit an icon, a UI, and/or other information to be presented. For example, desktop UI 100 may include a tool bar 102 and/or icons associated with an application or collection of applications (not shown in FIG. 1). Tool bar 102 may include a collection of fields (e.g., file, edit, view, tools, window, help, and/or other fields) that, when selected by the user, permit a user to perform operations (e.g., save, edit, print, adjust the physical appearance of desktop UI 100, etc.) associated with desktop UI and/or applications and/or files displayed via desktop UI 100.

The user may cause an operation to be performed on a file using a remora. For example, a user may open a folder that includes a file on which the user desires to perform a task, such as emailing a particular photo to a friend. As shown by indication A of FIG. 1, the user may, for example, select an icon (not shown in FIG. 1) located on a desktop (e.g., desktop UI 100) that corresponds to an application (e.g., MS Windows Explorer®, etc.) that renders a UI containing a directory and/or folders that store files that may be accessed by a user (e.g., shown as Pictures Folder 105). Pictures folder 105 may include a filename field 110 and/or a date field 115. Filename field 110 may include a list of filenames 120 corresponding to files (e.g., image files and/or some other type of file) stored in a memory. Date field 115 may include a list of dates 122, corresponding to the list of filenames 120 that indicate at which time the files were stored, updated, etc.

The user may select certain files and a remora may be opened. For example, the user may select a file or collection of files on which to perform an operation (e.g., using a pointing device to click on, to highlight the files, by using a finger on a touch screen, and/or by pressing a button, or series of buttons, on a keyboard/keypad associated with the user device), which may cause a generating application to open a remora UI (e.g., remora UI 125 corresponding to a photo application associated with the selected files), as shown by indication B. Remora UI 125 may include a selected images field 130, an image display field 135, and/or remora icons 140. Selected images field 130 may include the selected filenames and the image display field 135 may include thumbnails, previews, and/or other information associated with the selected filenames.

Remora icons 140 may include icons corresponding to applications that were associated with the photo application (e.g., during a remora set up operation at a prior point in time). For example remora icons 140 may include icons that correspond to applications associated with social networking services (e.g., Twitter® icon 142, Facebook® icon 145, Flickr® icon 149, and/or other social networking services). In another example, remora icons 140 may include icons that correspond to applications associated with email services (e.g., Gmail® icon 144, Microsoft Outlook® icon 147, and/or other email applications). In yet another example, remora icons 140 may include an icon that corresponds to an application that permits properties and/or details associated with a selected file to be obtained (e.g., Microsoft Windows® icon 148). In still another example, remora icons 140 may include other icons that correspond to applications associated with other services, such as a blog (e.g., blog icon—not shown), calling services (e.g., telephone icon 146), television services (e.g., Verizon® TV icon 143), video services (e.g., YouTube® icon 141), and/or other services. It should be understood that the icons, associated with remora icons 140, are provided for explanatory purposes only. In practice, remora icons 140 may include fewer icons, additional icons, different icons, or differently arranged icons than are described with respect to remora icons 140.

Operations on a selected file may be performed. For example, the user may, in a manner similar to that described above, select one more files (e.g., image_08.png) to be emailed to another user. More particularly, as shown by indication C, the user may move and/or transfer the selected file/image to a destination icon (e.g., Microsoft Outlook® icon 147) corresponding to a destination application (e.g., Microsoft Outlook®). The transfer may be performed using a pointing device (e.g., by clicking on and dragging the selected file/image to the destination icon), using a touch screen device (e.g., by touching the selected file/image with a finger or some other device and dragging the selected file/image to the destination icon), using a keyboard/keypad (e.g., by pressing a button or series of buttons), etc.

The destination icon may, as shown by indication D, indicate when the transferred file/image is capable of being operated on by a destination application corresponding to the destination icon. For example, as shown by Microsoft Outlook® icon 147, the generating application may cause the destination icon to change appearance (e.g., change color, grow in size, change shape, etc.) and/or provide some other indication (e.g., an audible sound, a vibration, etc.) when the selected file/image is positioned over the destination icon in a manner that permits the corresponding destination application to open and/or perform an operation on the transferred file/image.

An operation may be performed by the destination application and the task may be completed. For example, as shown by indication E, the application corresponding to the destination icon (e.g., Microsoft Outlook®) may receive the transferred file/image and the generating application may communicate with the destination application causing the destination application to automatically open, to render a user interface, such as an email user interface 150, and/or to automatically perform some operation (e.g., such as to automatically attach a transferred file). Email user interface 150 may include a recipient field 152, a subject field 154, an attachment field 156, a text field 158, and/or a send button 160. Recipient field 152 may permit a user to enter an email address corresponding to a recipient to whom the email is to be sent and/or another email address corresponding to another recipient to whom a copy is to be sent. Subject field 154 may permit a user to enter a subject for an email message. Attachment field 156 permits a document to be attached to an email. For example, the generating application may communicate with the destination application to cause the destination application to automatically attach the transferred file (e.g., image_08.png). Text field 158 may permit the user to enter text to be included with the email. Send button 160 may permit the user to send an email, to the identified recipients (e.g., the recipients entered in recipients field 152), that includes a particular subject (e.g., identified in subject line 154), the attached file/image (e.g., identified in attachment field 156), and/or the text (e.g., entered by the user into text field 158), which may complete the task.

The generating application may permit a user to perform a task on a file using a remora. The generating application may enable a user to open an application that includes a remora, to perform a set of operations on the file using applications associated with the remora, and/or to complete the desired task without the user opening a user interface for each application involved in the set of operations associated with the task.

Figure 2:
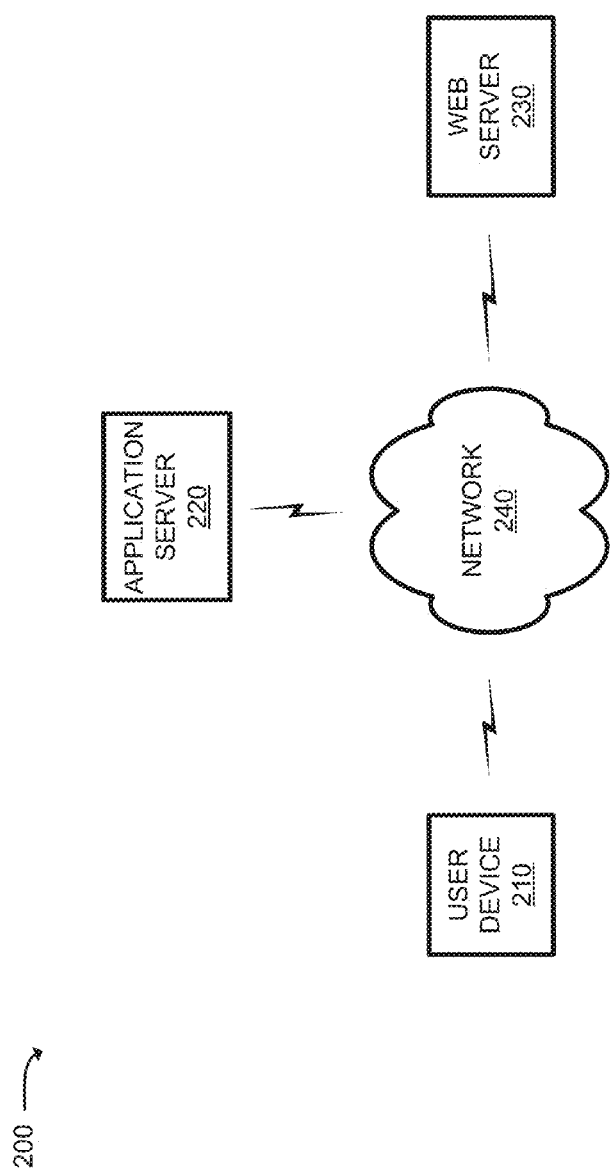
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a user device 210, an application server 220, and a web server 230 interconnected by a network 240. The number of devices, illustrated in FIG. 2, is provided for explanatory purposes only. In practice, there may be additional devices, fewer devices, different devices, or differently arranged devices than illustrated in FIG. 2.

Also, in some implementations, one or more of the devices of network 200 may perform one or more functions described as being performed by another one or more of the devices of network 200. Devices of network 200 may interconnect via wired connections, wireless connections, or a combination of wired and wireless connections.

User device 210 may include any computation or communication device, such as a wireless mobile communication device that is capable of communicating via network 240. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device. The description to follow will generally refer to user device 210 as a computer device. The description is not limited, however, to a computer device and may equally apply to other types of user devices.

User device 210 may perform an operation to set up a remora. For example, user device 210 may host a generating application and may use the generating application to set up a remora associated with an application. The generating application may present, for display on user device 210, a remora set up UI that may permit a user to select other applications to be associated with the application for which the remora is being created. The generating application may associate other applications with the application for which the remora is to be created.

User device 210 may perform an operation to set up a remoralet. For example, the generating application may permit the user to select, via the remora set up UI, an application for which a remoralet is to be created. In this example, the particular application for which the remoralet is to be created may be included in a remora (e.g., via an association operation as described above) and the generating application may permit the user to select an application, or a set of applications to be associated with the particular application for which the remoralet is to be created. The generating application may receive the selected application and may associate the particular application with the application for which the remoralet is to be created.

User device 210 may perform file management and transfer operations using the remora and/or remoralet. For example, the user device may render a remora UI associated with an application that includes icons via which operations, associated with a remora and/or remoralet may be performed. The generating application may, for example, enable a user to transfer selected files associated with an application to another application (e.g., to perform some operation on the selected files) by dragging the selected files to a remora icon and/or a remoralet icon associated with the other application. In one example, the generating application may enable a user to upload and/or download selected files associated with an application associated with social networking services (e.g., a social networking website, etc.) to share the selected files with friends and/or other users by dragging the selected files to an icon associated with the social networking websites that are contained in the remora UI. In another example, the generating application may enable a user to attach selected files to an email and/or an instant message sent via an email or messaging application by dragging the selected files to an icon associated with the email and/or messaging application. In yet another example, the generating application may enable a user to select an icon associated with an information application (e.g., Microsoft Windows®) to obtain properties and/or details associated with a selected file.

Application server 220 may include one or more server devices, or other types of computation or communication devices, that gather, process, search, store, and/or provide information in a manner similar to that described herein. For example, application server 220 may include a server device that authenticates user device 210 and/or downloads a generating application for a user of user device 210. Additionally, or alternatively, application 220 may send updates, patches and/or other information associated with the generating application to user device 210. In another example implementation, application server 220 may be associated with a service provider that manages services, accounts and/or billing operations which enables user device 210 to communicate with other devices associated with network 240.

Web server 230 may include one or more server devices, or other types of computation or communication devices, that gather, process, search, store, and/or provide information in a manner similar to that described herein. For example, web server 230 may host a social networking website and/or permit access to a social networking service with which user device 210 may communicate when using a remora. In another example, web server 230 may host a website and/or permit access to an open text-based forum (e.g., a chat room, a blog, etc.) with which user device 210 may communicate when using a remora. In yet another example, web server 230 may host a website and/or permit access to an email services, messaging service, telephone service, television service, streaming video service, and/or another service with which user device 210 may communicate when using a remora.

Network 240 may include one or more wired and/or wireless networks. For example, network 240 may include a cellular network, the Public Land Mobile Network (PLMN), a second generation (2G), third generation (3G), fourth generation (4G), fifth generation (5G), and/or another network. Additionally, or alternatively, network 240 may include a wide area network (WAN), a metropolitan area network (MAN), a telephone network (e.g., the Public Switched Telephone Network (PSTN)), an ad hoc network, an intranet, the Internet, a fiber optic-based network (e.g., a fiber optic service (FiOS) network), and/or a combination of these or other types of networks.

Although not shown in FIG. 2, network 200 may include a variety of other devices, such as an authentication server, a self-provisioning server, etc. Each of these devices may perform certain functions described briefly below. Any of these functions may be performed by application server 220 and/or web server 230. Thus, one or more of these devices may be integrated into application server 220 and/or web server 230.

The authentication server may include one or more server devices, or other types of computation or communication devices, that authenticates user device 210. For example, the authentication server may receive a request to authenticate user device 210 based on information associated with a user of user device 210 (e.g., username, password, email address, PIN, etc.), and/or information associated with user device 210 (e.g., an identifier associated with user device 210). The self-provisioning server may include one or more server devices, or other types of computation or communication devices that enable the registration of user device 210 in order to receive a generating application and/or permit user device 210 to communicate with other devices (e.g., web server 230, etc.). The self-provisioning server may store user profile information that may be used to determine whether user device 210 is configured and/or has the necessary permissions and/or authorizations to receive generating application, updates, and/or other services.

Figure 3:
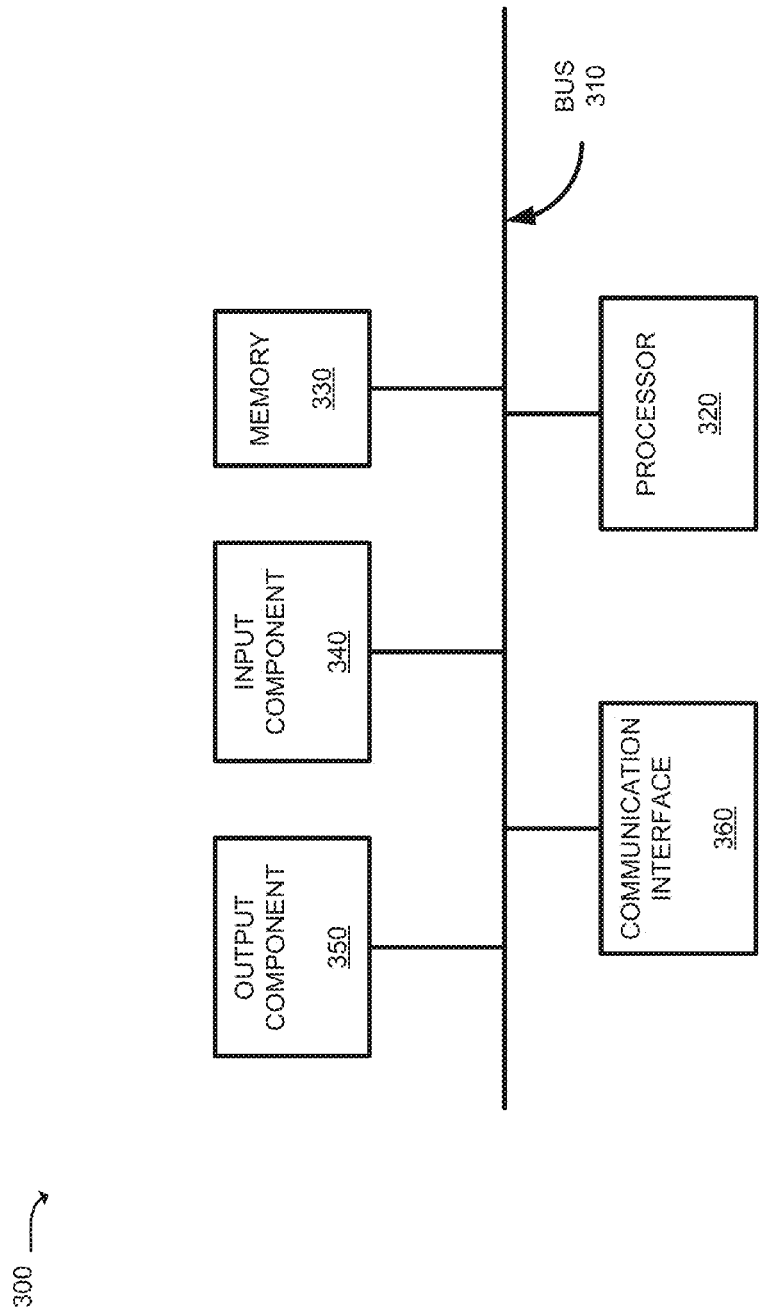
FIG. 3 is a diagram of example components of one or more of the devices of FIG. 2.

FIG. 3 is a diagram of example components of a device 300. Device 300 may correspond to user device 210, application server 220, and/or web server 230. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 240.

As will be described in detail below, device 300 may perform certain operations relating to file transfer and management using a remora. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
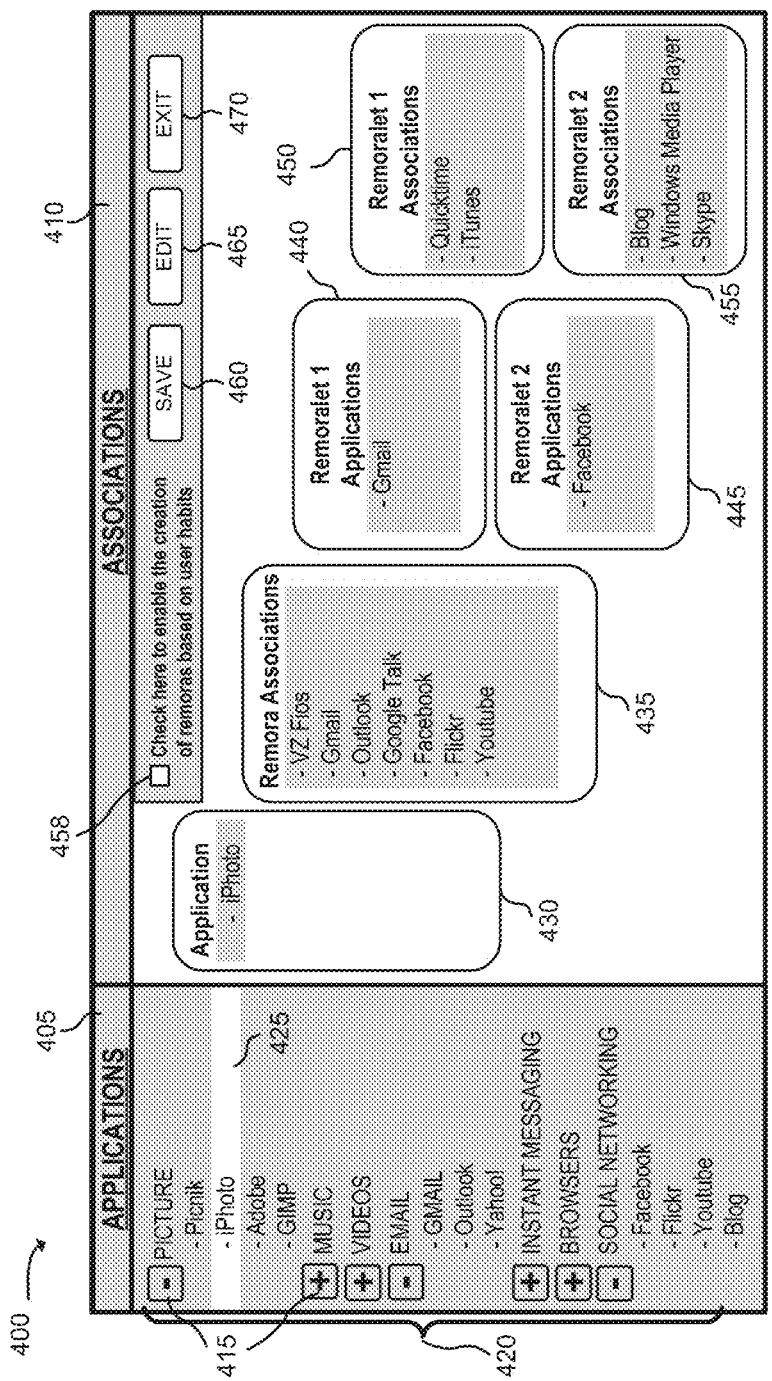
FIG. 4 is a diagram of an example remora set up user interface.

FIG. 4 is a diagram of an example remora set up UI 400. As illustrated in FIG. 4, remora set up UI 400 may include an applications UI 405 and/or an associations UI 410. Applications UI 405 may include expansion/contraction buttons 415, application listing 420, and/or highlight bar 425. Expansion/contraction button 415 may enable a user (e.g., a user of user device 210) to expand a category of applications (e.g., pictures) to view a list of applications associated with the category by selecting expansion/contraction button (e.g., by causing expansion/contraction button 415 to change from a "+" to a "−"). In another example, a user may cause a list of applications associated with an application category (e.g., music) to contract by selecting expansion/contraction button 415 (e.g., by causing expansion/contraction button 415 to change from "−" to "+"). Applications list 420 may include a list of applications from which a user may select an application to set up a remora. Highlight bar 425 may indicate which application has been selected by the user.

Associations UI 410 may include remora application field 430, remora associations field 435, remoralet applications fields 440 and 445, remoralet association fields 450 and 455, user habits box 458, save button 460, edit button 465, and/or exit button 470. It should be understood that the fields, illustrated in associations UI 410 are provided for explanatory purposes only. In practice, associations field 440 may include fewer fields, additional fields, different fields, or differently arranged fields than are described with respect to FIG. 4.

Remora application field 430 may include a selected application (e.g., iPhoto®) for which a remora is to be created. For example, the user may select a particular application (e.g., as indicated by highlight bar 425) and may transfer the particular application to remora application field 430 in a manner similar to that described above with respect to FIG. 1 (e.g., by moving and/or dragging to remora application field 430 using a pointing device, a touch screen, a keyboard/keypad, etc.). Remora associations field 435 may include other applications to be included in a remora associated with the particular application. For example, the user may select other applications (e.g., VZ Fios®, Gmail®, MS Outlook®, Google Talk®, Facebook®, Flickr®, YouTube®, etc.) and may transfer the other applications to remora associations field 435. Remoralet applications fields 440 and 445 may include applications included in the remora for which a remoralet may be created (e.g., remoralet 1 applications field 440 corresponding to Gmail® and/or remoralet 2 applications field 445 corresponding to Facebook®). Remoralet associations fields 450 and 455 may include applications to be included in remoralet 1 (e.g., QuickTime®, iTunes®, etc.) and/or remoralet 2 (e.g., Blog®, Windows Media Player®, Skype®, etc.).

In another example, the user may enable the generating application to edit associations for existing remoras and/or remoralets, and/or to establish associations for new remoras and/or remoralets (e.g., by causing a mark, such as an "X" or a "√," to be entered in user habits box 458) based on applications used by the user to perform operations on a file. For example, the user may use a particular application and/or set of applications to perform a particular operation, or set of operations, on a file and the generating application may determine that the user has, during a prior period of time, repeatedly performed (e.g., greater than some threshold) the particular operation, or set of operations, on other files using the particular application or set of applications. The generating application may, based on the determination, edit a remora and/or remoralet (e.g., if the application was associated with an existing remora and/or remoralet) and/or create a new remora and/or remoralet based on the repeated use of the application or set of applications.

In yet another example, the user may select save button 460, which may cause the generating application to receive an instruction, via remora set up UI 400, to perform an operation to associate the selected application, for which the remora is to be created, with other applications stored in remora associations field 435. Additionally, or alternatively, the generating application may perform an operation to associate applications, stored in remoralet association fields 450 and/or 455, with the applications stored in remoralet applications field 440 and/or 445, respectively. The generating application may store information associated with the remora, the remoralet and/or information associated with associations between applications included in the remora and/or remoralets. In still another example, the user may edit information associated with a saved remoralet by selecting edit button 465 and/or may exit remora set up UI 400 by selecting exit button 470.

Figure 5:
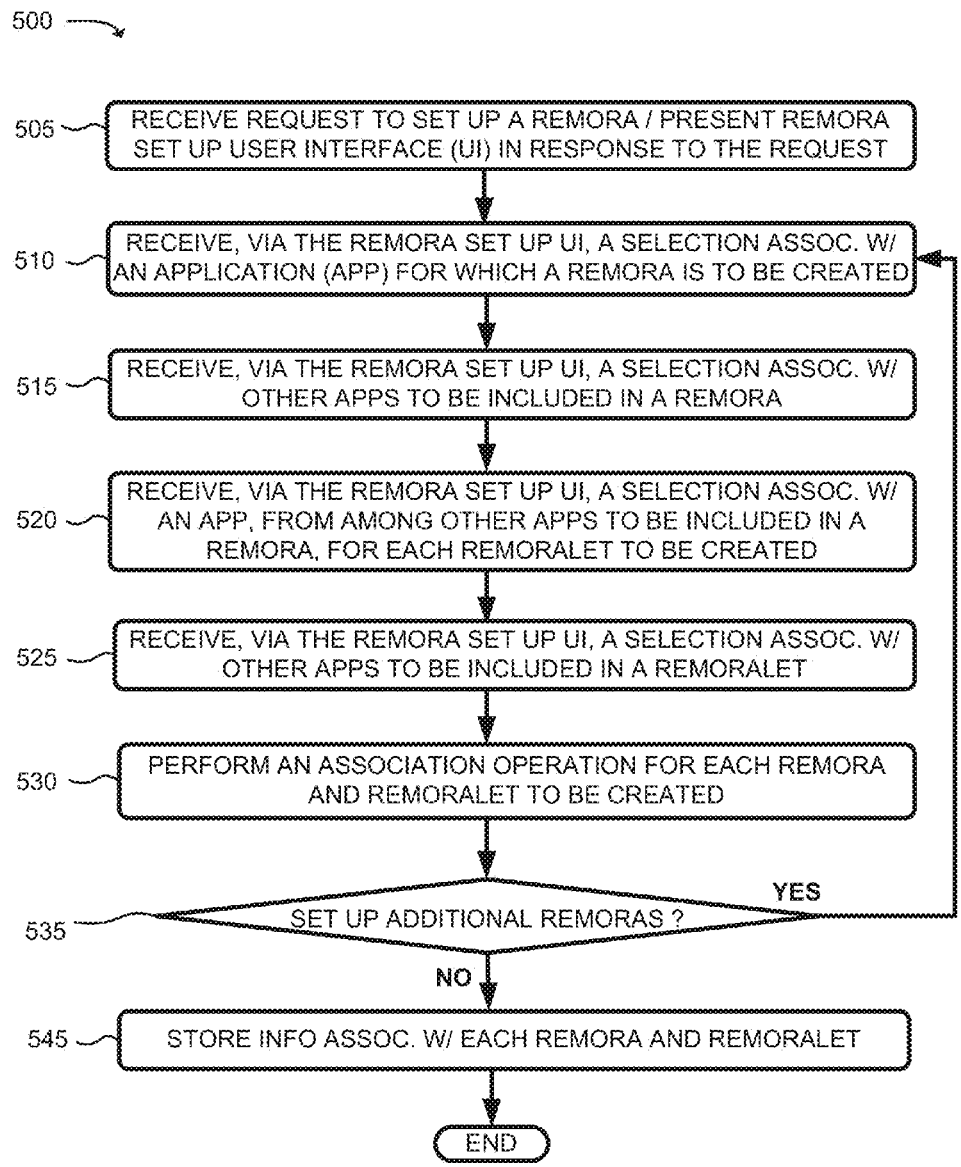
FIG. 5 is a flowchart of an example process for setting up a remora.

FIG. 5 is a flowchart of example process 500 for setting up a remora. In one implementation, process 500 may be performed by user device 210. In another implementation, some or all of process 500 may be performed by a device or collection of devices separate from, or in combination with, user device 210.

As shown in FIG. 5, process 500 may include receiving a request to set up a remora and presenting a remora set up UI in response to the request (block 505). For example, a generating application may receive a request to set up a remora for an application and the generating application may retrieve information associated with a remora set up UI (e.g., remora set up UI 400 of FIG. 4).

As further shown in FIG. 5, process 500 may include receiving a selection associated with an application for which a remora is to be created via the remora set up UI (block 510). For example, the user may select an application, from a list of applications (e.g., applications list 420 of FIG. 4) included in the remora set up UI (e.g., remora set up UI 400 of FIG. 4), for which a remora is to be created. Additionally, or alternatively, the user may, in a manner similar to that described above with respect to FIG. 1, transfer the selected application (e.g., iPhoto®) to a remora application field included in the set up UI (e.g., remora application field 430 of FIG. 4).

As yet further shown in FIG. 5, process 500 may include receiving selections associated with other applications to be included in a remora (block 515). For example, the user (e.g., the user of user device 210) may select other applications from the list of applications and may, in a manner similar to that described above (with respect to FIG. 1) transfer the selected other applications (e.g., VZ Fios®, Gmail®, Microsoft Outlook®, Google Talk®, Facebook®, Flickr®, YouTube®, etc.) to a remora associations field (e.g., remora associations field 435 of FIG. 4) included in the remora set up UI (e.g., remora set up UI 400 of FIG. 4).

As still further shown in FIG. 5, process 500 may include receiving a selection associated with an application, from among a set of applications to be included in a remora and via the remora set up UI, for each remoralet to be created (block 520). For example, the user may select (e.g., via remora set up UI 400 of FIG. 4) an application from a set of applications to be included in a remora. In this example, the user may select an application from a list of applications included in a remora associations field (e.g., remora associations field 435 of FIG. 4) and may transfer the application (e.g., Gmail® or some other application) to a remoralet application field (e.g., remoralet application field 440 of FIG. 4). In another example, the user may select another application from a list of applications included in the remora associations field and may transfer the other application (e.g., Facebook® or some other application) to a remoralet application field (e.g., remoralet application field 445 of FIG. 4).

As also shown in FIG. 5, process 500 may include receiving, via the remora set up UI, a selection associated with other applications to be included in a remoralet (block 525). For example, the user (e.g., the user of user device 210) may select other applications from an applications list (e.g., applications list 420 of FIG. 4) and may transfer the other applications (e.g., QuickTime®, iTunes®, and/or other applications) to a remoralet associations field included in the remora set up UI (e.g., remoralet associations field 450 of FIG. 4). In another example, the user may select further applications from the applications list (e.g., applications list 420 of FIG. 4) and may transfer the further applications (e.g., Blog, Windows Media Player, Skype, and/or other applications) to another remoralet associations field included in the remora set up UI (e.g., remoralet associations field 455 of FIG. 4).

As shown in FIG. 5, process 500 may include performing an association operation for each remora and remoralet to be created (block 530). For example, the generating application may receive the remora set up information from user device 210 via the remora set up UI (e.g., remora set up UI 400 of FIG. 4) and the user may save the remora set up information (e.g., when the user selects save button 460 of FIG. 4). The generating application may receive the request to save the remora set up information and may, for example, perform an operation to associate applications stored in remora associations field (e.g., remora associations field 435 of FIG. 4) with the application (e.g., iPhoto or some other application) stored in the remora application field (e.g., remora application field 430 of FIG. 4) for which the remora is being set up. In another example, the generating application may perform an operation to associate applications stored in each remoralet associations field (e.g., remoralet associations field 450 and/or 455 of FIG. 4) with the application (e.g., Gmail®, Facebook®, and/or some other application) stored in each remoralet application field (e.g., remoralet applications field 440 and/or 445 of FIG. 4) for which a remoralet, or a set of remoralets, are being set up.

As further shown in FIG. 5, if additional remoras are to be set up (block 535—YES), then another request to set up a remora may be received and the remora set up UI may be presented (block 510). For example, the user may desire to set up another remora and may, in a manner similar to that described above (e.g., with respect to block 510), select another application from a list of applications (e.g., applications list 420 of FIG. 4) included in the remora set up UI (e.g., remora set up UI 400 of FIG. 4). The user may, for example, transfer the selected application to a remora application field (e.g., remora application field 430 of FIG. 4) to perform the set up operation as described in blocks 510-530 of FIG. 5).

As yet further shown in FIG. 5, if additional remoras are not to be set up (block 535—NO), then information associated with each remora and remoralet may be stored (block 545). For example, the user may exit the set up UI (e.g., by selecting exit button 470 of FIG. 4) and the generating application may receive an indication, via the set up UI, that the user has exited the remora set up UI. The generating application may store information associated with each remora and/or remoralet in a memory associated with user device 210. The information associated with each remora and/or remoralet may include a selected remora application for which a remora was created, applications to be included in the remora, a selected remoralet application for each remoralet created, and/or applications to be included in each remoralet.

Figure 7A:
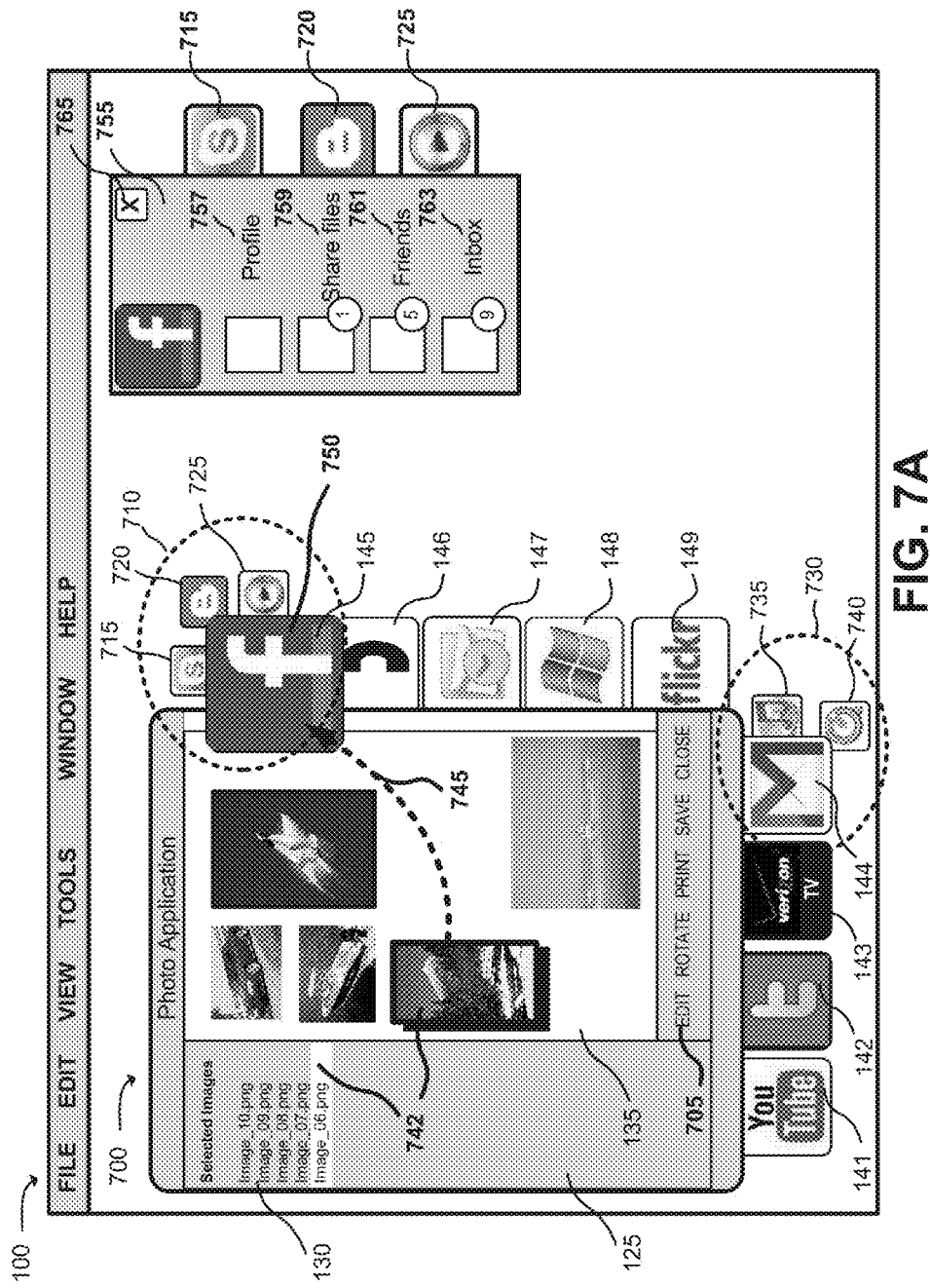

FIG. 6 is a flowchart of an example process 600 for using a remora to perform an operation on a file. In one implementation, process 600 may be performed by user device 210. In another implementation, some or all of process 600 may be performed by a device or collection of devices separate from, or in combination with, user device 210. FIGS. 7A and 7B are diagrams of example remora user interfaces 700-780. A portion of process 600, of FIG. 6, will be discussed below with corresponding references to example remora user interfaces 700-780 shown in FIGS. 7A and 7B.

As shown in FIG. 6, process 600 may include receiving a request to open an application for which a remora was created (block 605). For example, a user (e.g., of user device 210) may open a file associated with an application for which a remora was created (e.g., using the remora set up process 500 of FIG. 5). In another example, the user may open an application for which the remora was created.

As further shown by FIG. 6, process 600 may include retrieving information associated with a remora associated with an application (block 610). For example, user device 210, may receive the request to open an application for which a remora was created and may retrieve (e.g., from a memory associated with user device 210) information associated with the remora. In another example, user device 210 may determine that information associated with a remora (e.g., information regarding applications associated with the application to be opened) is stored in the memory and may retrieve the information associated with the remora.

As yet further shown in FIG. 6, process 600 may include opening an application and presenting a UI, associated with a remora, for display (block 615). For example, the generating application may cause the application associated with the request to open (e.g., iPhoto® as shown by remora application field 430 of FIG. 4) and/or may use the information associated with the remora, retrieved from the memory, to render a remora UI (e.g., remora UI 700 of FIG. 7A) on a desktop (e.g., desktop UI 100 of FIG. 1) and/or display associated with user device 210.

As illustrated in FIG. 7A, remora UI 700 may include all or a portion of the fields included in remora UI 125 of FIG. 1, such as selected images field 130, image display field 135, all or a portion of remora icons 141-149, and/or other fields and/or icons. Additionally, or alternatively, remora UI 700 may include an application toolbar 705, a remoralet associated with a remora icon (e.g., Facebook® icon 145) shown as ellipse 710, and/or another remoralet associated with another remora icon (e.g., Gmail® icon 144) shown as ellipse 730. Application toolbar 705 may include fields (e.g., edit, rotate, print, save, close, and/or other fields) that enable the user to perform operations using the opened application (e.g., iPhoto®), such as editing an image, rotating an image, printing an image, saving an image, closing remora UI 700, and/or performing other operations associated with the opened application. It should be understood that remora UI 700, of FIG. 7A, is described herein with respect to an iPhoto® application for explanatory purposes. In practice remora UI 700 may include an application that is different than the application described with respect to remora UI 700 of FIG. 7A. Additionally, or alternatively, remora UI 700, of FIG. 7A, includes remoralets associated with ellipse 710 and/or ellipse 730 for explanatory purposes. In practice, remora UI 700, of FIG. 7A, may include additional remoralets, fewer remoralets, different remoralets, and/or differently arranged remoralets than are described with respect to remora UI 700 FIG. 7A.

Ellipse 710 may include an icon (e.g., Facebook® icon 145) that corresponds to an application for which a remoralet was created. Additionally, or alternatively, ellipse 710 may include remoralet icons (e.g., Skype® icon 715, Blog® icon 720, Windows Media Player® icon 725, and/or other icons) that correspond to other applications associated with the application for which the remoralet was created (e.g., as identified in fields 445 and 455 of FIG. 4). Ellipse 730 may include an icon (e.g., Gmail® icon 144) that corresponds to an application for which another remoralet was created. Additionally, or alternatively, ellipse 730 may include remoralet icons (e.g., iTunes® icon 735, QuickTime® icon 740, and/or other icons), that correspond to other applications associated with the application for which the other remoralet was created (e.g., as identified fields 440 and 450 of FIG. 4).

Returning to FIG. 6, process 600 may include receiving a request, via a UI, to perform an operation on a file (block 620). For example, the user may desire to perform an operation on a file (e.g., image_06.png 742) associated with the open application and the user may select the file (e.g., with a pointing device, a touch screen, a keyboard/keypad, a highlight bar, and/or other devices and/or methods in a manner similar to that described with respect to FIG. 1). In one example, the generating application may receive a request, via remora UI 700, to perform an operation on the selected file using the opened application (e.g., when the user selects a field associated with toolbar 705).

In another example, the generating application may receive a request, via remora UI 700, to perform an operation on the selected file using another application (e.g., another application that is included in remora UI 700) when the user transfers the selected file (e.g., shown as dashed arrow 745) to a destination icon corresponding to the other application (e.g., Facebook® icon 145). The transfer operation may be performed by dragging and/or otherwise moving the selected file (e.g., with a pointing device, a touch screen, keyboard/keypad, and/or other devices and/or methods) to the destination icon in a manner similar to that described above with respect to FIG. 1. In yet another example, the generating application may, in a manner similar to that described above, receive a request to perform an operation on the selected file using another application that is included in a remoralet (e.g., a remoralet shown by ellipse 710 and/or ellipse 730) by transferring the selected file to a destination icon associated with a remoralet (e.g., remoralet icons 715-725, 735 and/or 740). It should be understood that an image file is used herein for explanatory purposes. In another implementation, other files types may be used, such as a document, a text file, a video file, streaming media, a music file, etc.).

As shown in FIG. 6, if the operation is not associated with a remora or a remoralet (block 625—NO), then an operation associated with an application may be performed (block 630). For example, if the generating application receives a request to perform an operation using the open application (e.g., when the user selects a field associated with tool bar 705), then the generating application may ignore the request and/or permit the open application to perform an operation associated with the request. In another example, the generating application may receive the request and may send the request to the open application to perform the operation.

As further shown in FIG. 6, if a request to exit is received (block 635—YES), then process 600 may end. For example, if the generating application receives a request to exit the open application (e.g., when the user closes the open application) and/or closes the remora associated with the open application (e.g., when the user selects the close field within toolbar 705), then the generating application may close the remora UI (e.g., remora UI 700) and process 600.

As yet further shown in FIG. 6, if a request to exit is not received (block 635—NO), then a request to perform another operation on a file may be received (block 620). For example, the generating application may, in a manner similar to that described above (with respect to block 620), receive a request to perform an operation on a file using the open application (e.g., iPhoto®), using another application associated with the remora, and/or using another application associated with a remoralet.

As shown in FIG. 6, if the operation is associated with a remora (block 625—YES/REMORA), then another application may be opened and a UI associated with the open application may be rendered (block 640). Assume, in this example, that the user, of user device 210, desires to upload the selected file to a Facebook® account to be shared with other users. For example, the generating application may receive (e.g., via remora UI 700) a request to perform an operation on the selected file using another application included in the remora, such as when the user transferred the selected file to a remora icon (e.g., Facebook® icon 145) that corresponds to the other application (e.g., a Facebook® application) as described above with respect to block 620. The generating application may, in a manner similar to that described above (e.g., with respect to FIG. 1), cause the remora icon to change appearance (e.g., as shown by Facebook® icon 750) when the selected file/image is positioned over the remora icon in a manner that permits the other application to open and/or to perform an operation on the transferred file/image. For example, the generating application may, based on the file transfer operation, communicate with web server 230 that may host and/or permit access to the other application, which may cause the other application to open and/or to present a UI associated with the other application (e.g., remoralet UI 755).

As illustrated in FIG. 7A, remoralet UI 755 may include proprietary fields and/or buttons, such as a profile field 757, a share files field 759, a friends field 761, an inbox field 763, a close window button 765 and/or other proprietary fields and/or buttons that are unique to the application for which a remora was created. It should be understood that remoralet UI 755, of FIG. 7A, is described herein with respect to a Facebook® application for explanatory purposes. In practice, a remoralet UI 755 may include an application that is different than the application described with respect to remoralet UI 755. Additionally, or alternatively, remoralet UI 755 may include proprietary fields 757-763 for explanatory purposes. In practice, remoralet UI 755 may include fewer proprietary fields, additional proprietary fields, different proprietary fields, or differently arranged proprietary fields than are described with respect to remoralet UI 755 of FIG. 7A.

Profile field 757 may store and/or permit access to a user profile that the user set up at a prior point in time. Share files field 759 may store and/or permit access to files to be uploaded and/or downloaded (e.g., where the encircled "1" may indicate that one picture, such as image_06.png, is in a queue to be uploaded). Friends field 761 may store and/or permit access to sent and/or received friend requests (e.g., where the encircled "5" may indicate that five friend requests have been received). Additionally, or alternatively, friends field 761 may permit a user to enter a friend to which the uploaded file may be sent (e.g., by selecting the box associated with friends field 761 and entering the name and/or email address associated with the friend). Inbox 763 may store and/or permit access to received and/or to sent messages (e.g., where the encircled "9" may indicate that nine messages have been received, remain unread, etc.) Close window box 765 may permit a user to close remoralet UI 755.

In another example, the generating application may determine, based on remora set up information associated with the open application (e.g., retrieved from a memory associated with user device 210), that a remoralet is associated with the open application (e.g., other applications associated with the Facebook® application). As illustrated in FIG. 7A, the generating application may present remoralet icons (e.g., remoralet icons 715-725), associated with the open application (e.g., Facebook® UI 755), based on the determination.

Returning to FIG. 6, process 600 may include performing an operation using the open application (block 645). For example, the user of user device 210 may enter a request to upload the transferred picture to an account associated with the open application by selecting a particular field (e.g., pictures field 759) in a UI associated with the open application. In another example, the request to upload the transferred picture may cause another UI associated with the open application to be rendered on user device 210 (e.g., proprietary UI 770 of FIG. 7B).

As illustrated in FIG. 7B, proprietary UI 770 may include all of, a portion of, additional, or different remoralet icons 715-725 (FIG. 7A). Additionally, or alternatively, proprietary UI 770 may include file field 772, message/caption field 774, upload file button 776, and/or close window button 777. It should be understood that proprietary UI 770, of FIG. 7B, is described herein with respect to a Facebook® application for explanatory purposes. In practice, proprietary UI 770 may include an application that is different than the application described with respect to proprietary UI 770. Additionally, or alternatively, proprietary UI 770 may include fields 772-774 and/or buttons 776-777 for explanatory purposes. In practice, proprietary UI 770 may include fewer fields and/or buttons, additional fields and/or buttons, different fields and/or buttons, or differently arranged fields and/or buttons than are described with respect to proprietary UI 770 of FIG. 7B.

File field 772 may include a file name, a thumbnail, and/or some other indicator of a file to be uploaded. Message caption field 774 may permit a user to enter a message and/or caption to be uploaded to an account associated with a remoralet application. Upload file button 776 may enable a user to upload a file by selecting upload file button 776 (e.g., with a pointing device and/or by selecting a button on a keyboard/keypad associated with user device 210). Close window button 777 may permit a user to close proprietary UI 770. For example, the user may select upload file button 776 (e.g., using a pointing device and/or a keyboard/keypad associated with user device 210), which may cause the generating application to communicate with web server 230 to upload the file (e.g., image_06.png) to an account associated with the open application (e.g., Facebook®). In another example, the user may enter text into message caption field 774 to be uploaded, with the file, to the account associated with the open application.

Returning to FIG. 6, if a request to exit is received (block 650—YES), then process 600 may end. For example, if the generating application receives a request to exit the open application (e.g., when the user closes the open application associated with remora UI 700 of FIG. 7A), then the generating application may close the remora UI (e.g., remora UI 700) and/or other UIs associated with remora UI 700) and process 600 may end. In another example, the generating application may determine whether the user has enabled remoras and/or remoralets to be created based on user habits (e.g., by determining whether the box 462 was selected in FIG. 4 via remora set process 500 of FIG. 5) and if enabled, may store information associated with applications that were used to perform an operation on a file, such as applications associated with remora UI 700 (e.g., applications corresponding to remora icons 141-149 of FIG. 7A), remoralet UI 755 (e.g., applications corresponding to remoralet icons 715-715), and/or other applications that are not associated with remora UI 700. In this example, the generating application may use the information associated with applications that were used to perform the operation (e.g., operations performed on the uploaded file and/or operations performed at a prior point in time) and may determine that a particular application and/or set of applications are frequently used by the user (e.g., a frequency that is greater than a threshold). Based on the determination, the generating application may edit an existing remora and/or remoralet and/or may create a new remora and/or remoralet.

As further shown in FIG. 6, if a request to exit is not received (block 650—NO), then a request to perform an operation on another file may be received via a UI (block 620). For example, the generating application may, in a manner similar to that described above (with respect to block 620), receive a request to perform an operation on a file using the open application (e.g., iPhoto® and/or some other application), using another application associated with a remora (e.g., corresponding to remora icons 141-149 of FIG. 7A), and/or using another application associated with a remoralet (e.g., corresponding to remoralet icons 715-725 and/or 735-740 of FIG. 7A).

As shown in FIG. 6, if the operation is associated with a remoralet (block 625—YES/REMORALET), then another application included in a remoralet may be opened and a UI associated with the other application may be rendered (block 655). For example, a user may desire to perform an operation on a selected file (e.g., upload image_06.png to a blog) using an application associated with a remoralet. In this example, the user may, in a manner similar to that described above (e.g., with respect to block 640), transfer the file to a remoralet icon (e.g., by selecting and dragging the selected file to a Blog icon 720). In another example, assume that a user desires to upload a particular music file with the selected file (e.g., image_06.png) to an account associated with another application (e.g., Facebook®). For example, the user may select a remoralet icon associated with an application from which the desired music file may be retrieved (e.g., Windows Media Player® icon 725 of FIG. 7B). In this example, the generating application may receive the selection and may cause an application and/or UI corresponding to the selected remoralet icon to open (e.g., remoralet application UI 780 of FIG. 7B).

As illustrated in FIG. 7B, remoralet application UI 780 may include a filename field 782, selection bar 784, and close UI box 785. Filename field 782 may store a list of filenames that may be used by the open application. Selection bar 784 may be used to highlight a file on which an operation is to be performed (e.g., transfer, open, delete, etc.). Close UI box 785 may permit the user to close remoralet application UI 780.

Returning to FIG. 6, process 600 may include performing operations using the other application (block 660). For example, the user may select a particular file (e.g., music_05.wav) and may transfer the file to message/caption box field 774 of application UI 770 (FIG. 7B) (e.g., as shown by dashed arrow 786 of FIG. 7B) to be uploaded to an account associated with application UI 770. In another example, the user may open the selected file (e.g., by double clicking with a pointing device and/or by pressing a button or series of buttons on a keyboard/keypad, etc.) and may use the opened application to play the file. In still another example, the user may select the particular file and may transfer the file to another application (e.g., an icon corresponding to an application associated with the remora, another remora, and/or or another remoralet).

Implementations described herein may provide for file management and transfer using a remora. In one example implementation, a user may set up a remora for an application by associating other applications with the application. For example, the user may use a remora set up UI to identify other applications to be included in a remora and/or a remoralet associated with an application. The generating application may receive information associated with the other applications and may perform an operation to associate the other applications with the application to create the remora and/or remoralet for the application.

In another example implementation, a user may use a remora to perform an operation on a file using an application for which a remora was created. The user may select a file, via a remora UI, and may use the application for which the remora was created to perform an operation on the selected file. In another example, the user may transfer the selected file to a remora icon that corresponds to another application, associated with the remora, which is capable of performing some other operation on the selected file. The generating application may cause the other application to automatically open which may enable other operations to be performed on the selected file.

In yet another example, the user may select a file, via a remora UI, and may transfer the selected file to a remoralet icon that corresponds to another application, associated with a remoralet, which is capable of performing some other operation on the selected file. The generating application may cause the other application, associated with the remoralet, to automatically open which may enable other operations to be performed on the selected file.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor that executes software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a user device, comprising:
   receiving, by the user device, a request to open a first application associated with a selected file;
   retrieving, from a memory associated with the user device and in response to the request, information regarding:
      a user interface (UI) associated with the first application via which multiple operations on the selected file are automatically performed, and
      a set of second applications automatically associated with the first application based on a frequency of use of each of the second applications in performing respective ones of the multiple operations with respect to other files via the user device, wherein the frequency of use exceeds a threshold number greater than one,
      the information regarding the UI including:
         information associated with a UI icon corresponding to the first application, and
         information identifying a set of icons, that each correspond to a respective different one of the set of second applications;
   presenting, by the user device via a display, the UI icon and the identified set of icons, based on the information regarding the UI;
   receiving, by the user device and via the UI icon, an instruction to move the selected file to one of the identified set of icons; and
   performing, by the user device, a selected operation on the selected file using an identified application, of the set of second applications, that corresponds to the one of the identified set of icons.

2. The method of claim 1, further comprising:
   receiving a request to edit the UI icon associated with the first application;
   presenting, for display on the user device, a set up UI via which a user of the user device selects one or more third applications, of a plurality of other applications, to be associated with the first application in the UI icon, wherein the third applications differ from the second applications;
   receiving, via the set up UI, selection of the one or more third applications; and
   editing, in the memory, the information regarding the UI icon with respect to associating the one or more third applications with the first application.

3. The method of claim 1, wherein presenting the UI icon further includes:
   presenting the information associated with the UI icon, corresponding to the first application, for display on the user device; and
   presenting the identified set of icons, via the display at a periphery of or within a perimeter of the UI icon corresponding to the first application.

4. The method of claim 1, wherein receiving the instruction to move the selected file to the one of the identified set of icons further includes:
   receiving, via the UI icon, a selection corresponding to the selected file on which to perform the selected operation; and
   moving, via the UI icon, the selected file to the one of the identified set of icons.

5. The method of claim 4, wherein moving the selected file includes:
   receiving an instruction to drag the selected file from the UI icon, corresponding to the first application, to the one of the identified set of icons, wherein the instruction to drag the file is received from at least one of a pointing device associated with the user device, a keyboard device associated with the user device, or a touch screen device associated with the user device.

6. The method of claim 1, wherein performing the selected operation on the selected file using the identified second application includes:
   automatically sending an instruction, to the identified second application, to open and perform a function using a second file based on the determination that the operation on the selected file is associated with the identified application.

7. The method of claim 1, further comprising:
   receiving, via the UI icon, another instruction to perform another operation on another selected file;
   determining that the other operation on the other selected file is associated with the first application; and
   performing the other operation on the selected file using the first application based on the other instruction to perform the other operation.

8. The method of claim 1, further comprising:
   receiving, via the UI icon, another instruction to move the selected file to another icon associated with the one of the identified set of icons;
   determining that the selected operation on the selected file is associated with another application based on the movement of the selected file to the other icon, the other icon corresponding to the other application; and performing another selected operation on the selected file using the other application based on the instruction to move the file to the other icon.

9. A user device comprising:
a memory to store information comprising:
a user interface (UI) icon, associated with a first application, via which multiple operations on a selected file are automatically performed, and
a set of second applications automatically associated with the first application based on a frequency of use of each of the second applications in performing respective ones of the multiple operations with respect to other files via the user device, wherein the frequency of use exceeds a threshold number greater than one,
wherein the information regarding the UI icon identifies a set of icons, that each correspond to a respective different one of the set of second applications; and
a processor to:
receive a request to open the first application,
retrieve, from the memory and in response to the request, the information regarding the UI icon,
present, for display on the user device, the UI icon including a visual border, associated with the first application, outside of which are presented the identified set of icons,
receive, via the UI icon, an instruction to move the selected file to a particular icon of the identified set of icons, and
perform a selected operation on the selected file using a particular application of the set of second applications based on the movement of the selected file to the particular icon, the particular application corresponding to the particular icon.

10. The user device of claim 9, wherein the processor is further configured to:
receive a request to edit the UI icon associated with the first application,
present, for display on the user device, a set up UI via which a user identifies one or more other third applications, to be associated with the first application in the UI icon, wherein the third applications differ from the second applications,
receive, via the set up UI, selection of the identified one or more third applications,
associate the one or more third applications with the first application, and
edit, in the memory, the information regarding the UI icon to indicate the association of the one or more third applications.

11. The user device of claim 9, wherein the UI icon includes a UI associated with the first application and at least the particular application.

12. The user device of claim 9, wherein, when receiving the instruction to move the selected file, the processor is further configured to:
receive an instruction to drag the selected file from the UI icon associated with the first application to the particular icon.

13. The user device of claim 12, wherein, when performing the selected operation using the particular application, the processor is further configured to:
determine that the selected operation is to be performed by the particular application when the selected file is dragged to a location that corresponds to the particular icon, and
send an instruction, to the particular application, to open and perform a function on the selected file based on the determination that the selected operation is to be performed by the particular application.

14. The user device of claim 9, wherein the processor is further configured to:
receive, via the UI icon, another instruction to perform another selected operation on the selected file,
determine that the other selected operation on the selected file is associated with another application that is not associated with the UI icon, and
edit the UI icon to include the other application based on performance of the other selected operation.

15. A system, comprising:
a memory to store information regarding:
a user interface (UI), associated with a first application, via which multiple operations on a selected file are automatically performed, and
a set of second applications automatically associated with the first application based on a frequency of use of each of the second applications in performing respective ones of the multiple operations with respect to other files via the user device, wherein the frequency of use exceeds a threshold number greater than one,
wherein the information regarding the UI identifies a set of icons that each corresponds to a respective different one of the set of second applications; and
a processor to:
receive a request to open the first application,
retrieve, from the memory and in response to the request, the information regarding the UI,
present, on a display and based on the information regarding the UI:
a UI icon associated with the UI, the UI icon including one or more visual borders associated with the first application, and
the identified set of icons, each of the identified set of icons appearing at a periphery of the one or more visual borders,
receive, via the UI icon, an instruction to move the selected file, from a location within the one or more visual borders, to a particular icon, of the identified set of icons, and
perform a selected operation on the selected file using a particular application of the set of second applications based on the movement of the selected file to the particular icon, the particular application corresponding to the particular icon.

16. The system of claim 15, wherein the processor is further configured to:
receive a request to edit the UI icon associated with the UI,
present, for display on the user device, a set up UI via which a user selects one or more other third applications which differ from the second applications,
receive, via the set up UI, selection of the one or more third applications, and
edit, in the memory, the information regarding the UI icon with respect to associating the one or more third applications with the first application.

17. The system of claim 15, wherein, when receiving the instruction to move the selected file, the processor is further configured to:
receive, via the UI icon, an instruction to drag the selected file from the location within the one or more visual borders, to a location corresponding to the particular icon, and move the selected file to the particular application in response to the dragging of the selected file to the location corresponding to the particular icon.

18. The system of claim 15, further comprising:
receiving, via the UI icon, an instruction to move another selected file, from another location within the one or more visual borders, to another icon that appears to be in contact with the particular icon and not with any of the one or more visual borders, and which corresponds to a third application that is associated with the particular application, and perform a third operation on the other file that includes uploading the other file to a server device associated with the third application, in response to the movement of the other selected file.

19. The system of claim 15, wherein, when performing the selected operation on the selected file using the particular application, the processor is further configured to:
send the selected file to a server device that permits access to the particular application.

20. The system of claim 19, wherein, when sending the selected file to the server device, the processor is further configured to:
receive, via the UI icon, information regarding a user of a user device, associated with a social networking application, the social networking application being the particular application, and upload the selected file to a second server device associated with the social networking application that enables the user of the user device to access the selected file.

21. The system of claim 15, wherein the one or more visual borders associated with the first application include at least one commercial identifier associated with the first application.

22. The system of claim 15, wherein each of the identified set of icons include at least one commercial identifier associated with each of the set of second applications, wherein each of the at least one commercial identifier for each icon, of the identified set of icons, corresponds to a respective different one of the set of second applications.

23. The system of claim 15, wherein the processor is further configured to:
receive, via the UI icon, another instruction to perform another operation on the selected file, determine that the other operation is associated with one or more third applications that are not associated with the UI icon, and perform an operation to create another icon that includes associating the selected file with a particular application of the one or more third applications.

* * * * *